(12) United States Patent
Kim et al.

(10) Patent No.: US 8,259,070 B2
(45) Date of Patent: Sep. 4, 2012

(54) DISPLAY FOR A KEYPAD AND ELECTRONIC DEVICE HAVING THE SAME

(75) Inventors: Kyongdo Kim, Yongin-si (KR); Hyunah Jang, Yongin-si (KR); Hyungjun Namgung, Yongin-si (KR); Woojong Lee, Yongin-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 820 days.

(21) Appl. No.: 12/105,628

(22) Filed: Apr. 18, 2008

(65) Prior Publication Data
US 2008/0284737 A1 Nov. 20, 2008

(30) Foreign Application Priority Data
Apr. 19, 2007 (KR) .................. 10-2007-0038407

(51) Int. Cl.
*G06F 3/02* (2006.01)
(52) U.S. Cl. ........................ 345/168; 345/169
(58) Field of Classification Search .................. 345/168, 345/169, 172, 173; 455/90, 550, 566, 575
See application file for complete search history.

(56) References Cited

U.S. PATENT DOCUMENTS

| | | | |
|---|---|---|---|
| 5,496,974 A | 3/1996 | Akebi et al. | |
| 6,771,247 B2 * | 8/2004 | Sato et al. | 345/98 |
| 6,824,321 B2 * | 11/2004 | Ward et al. | 400/479 |
| 2002/0107055 A1 | 8/2002 | Yamazaki et al. | |
| 2003/0112227 A1 | 6/2003 | Hong | |
| 2004/0085299 A1 | 5/2004 | Huang et al. | |
| 2004/0265602 A1 * | 12/2004 | Kobayashi et al. | 428/458 |
| 2005/0052582 A1 * | 3/2005 | Mai | 349/12 |
| 2005/0093767 A1 * | 5/2005 | Lu et al. | 345/1.1 |
| 2006/0044279 A1 | 3/2006 | Nasu et al. | |
| 2006/0221059 A1 * | 10/2006 | Choi et al. | 345/169 |
| 2007/0029172 A1 * | 2/2007 | Choi et al. | 200/1 B |

FOREIGN PATENT DOCUMENTS

| | | |
|---|---|---|
| CN | 1427330 | 7/2003 |
| CN | 1704875 | 12/2005 |
| CN | 1809865 | 7/2006 |
| DE | 3320107 A1 | 12/1984 |

(Continued)

OTHER PUBLICATIONS

U.S. Appl. No. 12/105,517, filed Apr. 18, 2008, Kyongdo Kim, et al., Samsung SDI Co., Ltd.

(Continued)

*Primary Examiner* — Amare Mengistu
*Assistant Examiner* — Stacy Khoo
(74) *Attorney, Agent, or Firm* — Lee & Morse, P.C.

(57) ABSTRACT

A display for a keypad and an electronic device including the display that can improve a user interface environment and stability of input in which the display for the keypad includes: a display panel having a first display region and second display regions; a circuit board disposed on the display panel and including a first opening corresponding to the first display region, second openings corresponding to the second display regions, and keys formed adjacent to the second openings; a touch panel, formed in the first display region in a shape corresponding to the first display region and arranged to fill the first opening; and a pad disposed on the circuit board and including pressing units formed to correspond to the keys.

23 Claims, 14 Drawing Sheets

FOREIGN PATENT DOCUMENTS

| | | |
|---|---|---|
| GB | 1 593 414 | 7/1981 |
| GB | 2255234 A | 10/1992 |
| JP | 61-40414 | 3/1986 |
| JP | 62-187921 | 8/1987 |
| JP | 62-151636 | 9/1987 |
| JP | 1-223525 | 9/1989 |
| JP | 4-299407 | 10/1992 |
| JP | 4-319720 | 11/1992 |
| JP | 2002-216570 | 8/2002 |
| JP | 2006-65611 | 3/2006 |
| KR | 10-0217794 | 6/1999 |
| KR | 10-0238130 | 10/1999 |
| KR | 10-0330755 | 3/2002 |
| KR | 10-2004-0058731 | 7/2004 |
| WO | WO 2004/097785 | 11/2004 |

OTHER PUBLICATIONS

English-language abstract of KR 10-2001-0039294.

Japanese Office Action dated Oct. 5, 2010, issued in corresponding Japanese Patent Application No. 2008-106002.

European Search Report in EP 08251458.9-2224/1983403, dated May 18, 2011 (Kim, et al.).

* cited by examiner

DISPLAY FOR A KEYPAD AND ELECTRONIC DEVICE HAVING THE SAME

CROSS-REFERENCE TO RELATED APPLICATIONS

This application is claims benefit of Korean Patent Application No. 2007-38407 filed on Apr. 19, 2007 in the Korean Intellectual Property Office (KIPO), the contents of which is incorporated herein by reference.

BACKGROUND OF THE INVENTION

1. Field of the Invention

Aspects of the present invention relate to a display for a keypad and an electronic device having the same.

2. Description of the Related Art

Generally, electronic devices, such as a mobile communication terminal, include a keypad device for easily inputting various instructions. Numbers or specific symbols have been previously allocated to each key of the keypad device. A user can properly perform various functions, such as phone calling, text inputting, photographing, and reproducing moving images, by operating the keypad.

However, in a conventional keypad device, unique characters, numbers, or symbols are dedicated to each key. Therefore, there is no problem when the user uses only the function of phone calling and receiving, but the additional functions other than the function of phone calling and receiving requires multiple key strokes of the dedicated keys. In other words, a depth of the user interface is great, and thus key operation is inconvenient and difficult.

Technologies using a touch screen as the keypad have been developed for solving such problems as described above. However, the touch screen is problematic in that the user cannot surely feel a sense of pressing when the user touches or presses the keys, and instructions are not stably inputted due to characteristics of the touch panel.

SUMMARY OF THE INVENTION

According to aspects of the present invention, there is provided a display for a keypad, which includes: a display panel having a first display region and second display regions; a circuit board disposed on the display panel, the circuit board including a first opening corresponding to the first display region, second openings corresponding to the second display regions, and keys formed adjacent to the second openings; a touch panel formed in the first display region in a shape corresponding to the first display region and arranged to fill the first opening; and a pad disposed on the circuit board and including pressing units formed to correspond to the keys.

According to aspects of the present invention, there is provided a display for a keypad, which includes: a display panel having a first display region to display first images and second display regions to display second images, the first display region and the second display regions being separated by non-display regions; a circuit panel disposed on the display panel having openings corresponding to the first and second display regions and keys adjacent to the second display regions; a pad disposed on the circuit panel having openings corresponding to the first and second display regions and pressing units corresponding to the keys; and a touch panel corresponding to the first display regions to detect a touch selection of at least one of the first images, wherein the second images correspond to the selected at least one of the first images.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
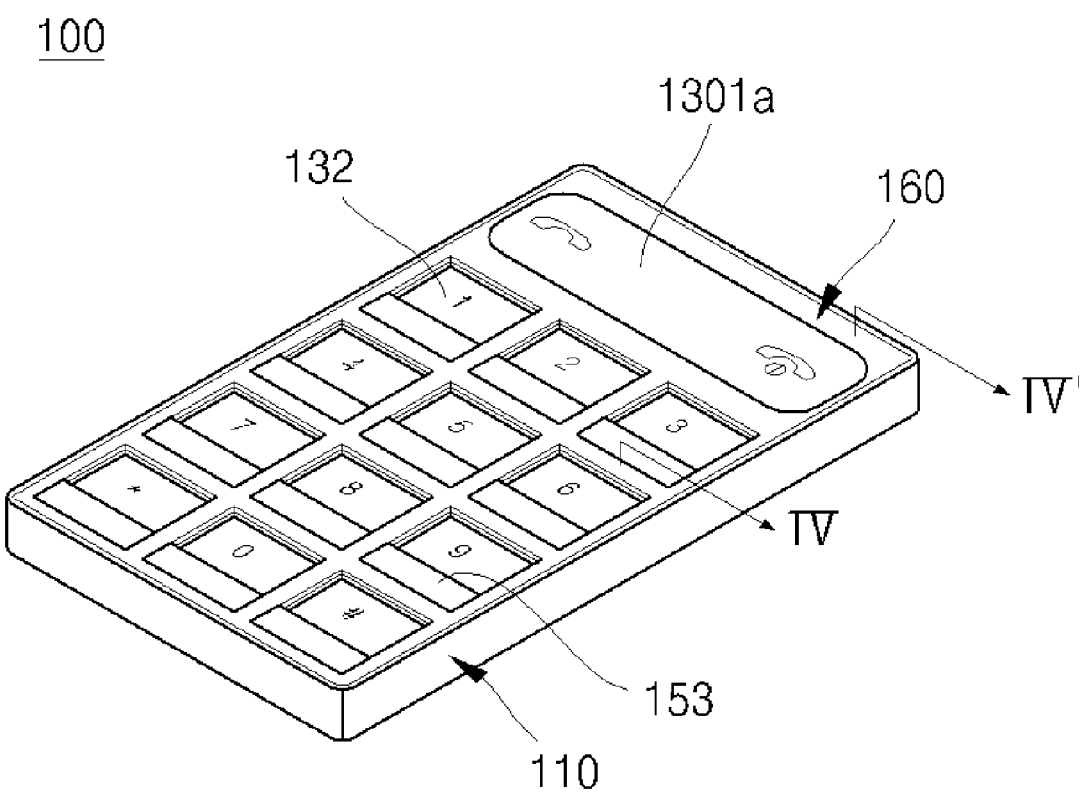
FIG. 1A is a perspective view illustrating a combined state of a display for a keypad according to one exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

Figure 1B:
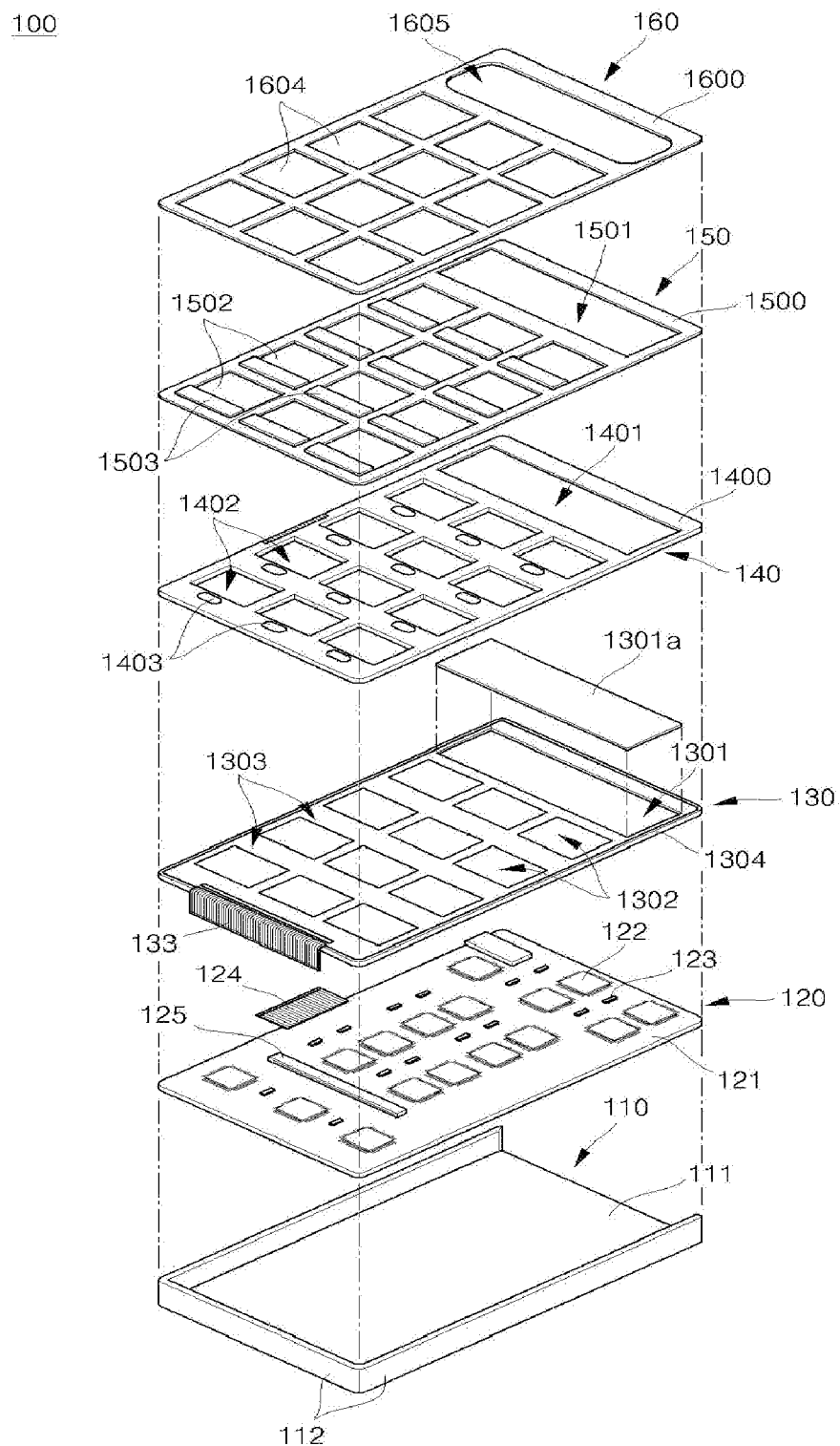
FIG. 1B is an exploded perspective view of the display for the keypad.

FIG. 1A is a perspective view illustrating a combined state of a display for a keypad according to one exemplary embodiment of the present invention, and FIG. 1B shows an exploded perspective view of the display for the keypad. Referring to FIGS. 1A and 1B, a display 100 for a keypad includes a display panel 130, a touch panel 1301a mounted on a first display region 1301 of the display panel 130, a circuit board 140 mounted on the display panel 130, and a pad 150 mounted on the circuit board 140.

In addition, the display 100 for the keypad may further include a case 110, a main circuit board 120 mounted on the case 110, and a cover 160 mounted on the pad 150.

The case 110 includes a bottom surface 111, and a plurality of side walls 112 formed at a predetermined height at a periphery of the bottom surface 111. The case 110 may be formed of a plastic resin or a metal, but the case 110 is not limited thereto. In addition, the main circuit board 120, the display panel 130, the touch panel 1301*a*, the circuit board 140, the pad 150, and the cover 160 are mounted on the case 110. A power source may be further provided in the case 110 to supply power to the main circuit board 120 and the circuit board 140, but is not shown.

The main circuit board 120 includes a substrate body 121 that may be of a rectangular plate shape, and a plurality of active devices 122, a plurality of passive devices 123, a first flexible circuit 124, and a connector 125 mounted on the substrate body 121. The main circuit board 120 supplies or receives an electrical signal to/from the display panel 130, the touch panel 1301*a*, the circuit board 140, or a main display panel 403 (of FIG. 11A) of an electronic device to be described below. The first flexible circuit 124 is electrically coupled to the circuit board 140. A second flexible circuit 133 connected to the display panel 130 is electrically coupled to the connector 125.

The display panel 130 includes a first display region 1301 and a plurality of second display regions 1302 separated by a non-display region 1303. The touch panel 1301*a* to be described below is mounted on the first display region 1301. In addition, the plurality of second display regions 1302 is arranged roughly in a matrix type in FIG. 1B but is not limited thereto. Other arrangement structures of the display regions 1301 and 1302 will be explained later; however, the arrangement of the first and second display regions is not limited thereto. One side of the display panel 130 is electrically coupled to the second flexible circuit 133 that is electrically coupled to the connector 125 of the main circuit board 120. In addition, the display panel 130 includes a bezel 1304 disposed at a periphery of the display panel 130, and the bezel may be made of resin or metal so as not to be damaged by external impact. Here, thirteen first and second display regions 1301 and 1302 formed on the display panel 130 are shown in FIGS. 1A and 1B, but the display 100 is not limited thereto. In other words, larger or smaller numbers of first and second display regions 1301 and 1302 may be formed on the display panel 130. Further, the first and second display regions 1301 and 1302 formed on the display panel 130 are shown in rectangular shape, but not limited thereto. In other words, the first and second display regions 1301 and 1302 may be formed in various shapes, such as circle, triangle, pentagon, or hexagon.

The touch panel 1301*a* is provided only on the first display region 1301 of the display panel. In other words, the touch panel 1301*a* is not provided on the plurality of second display regions 1302. When a resistive touch panel is used, the touch panel 1301*a* may include a substrate (not shown), a transparent conduction pattern (not shown) and a dot spacer (not shown). In addition, the touch panel 1301*a* may further include a protection film (not shown). A detailed structure of the touch panel 1301*a* will be explained later.

The display 100 for the keypad can freely change and display characters, numbers, specific symbols, still images, and moving images on the first display region 1301 provided under the touch panel 1301*a* and the plurality of second display regions 1302 according to the user's choice. Thus, a user interface depth becomes shallow and key operation also becomes easy. In other words, different screen information is displayed according to the function used by the user. Thus, key operation for performing a particular function can be prominently simplified.

An image is not displayed on the non-display region 1303 except for the first and second display regions 1301 and 1302 in the body of the display panel 130. Thus, power consumption is minimized. In other words, pixels are formed on the first and second display regions 1301 and 1302 of the display panel 130 for emitting light of a predetermined color (red, green, or blue), and pixels are not formed on the non-display region 1303. Thus, power is used only in the first and second display regions 1301 and 1302 of the display panel 130 where the pixels are formed, and not used in the non-display region 1303 where the pixels are not formed. However, the display 100 is not limited thereto such that the non-display region 1303 may include pixels so as to display static or dynamic images.

The display panel 130 may be, for example, any one of a passive matrix organic light emitting display, an active matrix organic light emitting display, a liquid crystal display, and similar display devices, but the display panel 130 is not limited thereto. Display devices using a passive matrix organic light emitting display, an active matrix organic light emitting display, and a liquid crystal display as the display panel 130 will be explained in more detail later.

The circuit board 140 includes a substrate body 1400 having an first opening 1401 and a plurality of second openings 1402 formed on regions corresponding to the first and second display regions 1301 and 1302 of the display panel 130, and a plurality of keys 1403 formed on regions corresponding to the non-display region 1303 at one sides of the plurality of second openings 1402. Although the keys 1403 are illustrated as corresponding to the second display regions 1302 in a 1:1 ratio, aspects of the present invention are not limited thereto such that multiple keys 1403 may correspond to a single second display region 1302 or a single key 1403 may correspond to multiple second display regions 1302. The touch panel 1301*a* is disposed in the first opening 1401, and the second openings 1402 may be closed by any one selected from a transparent resin, a transparent glass, and the like. Thus, the first and second display regions 1301 and 1302 of the display panel 130 may be separated from external environments. In addition, the plurality of keys 1403 are formed on regions that do not correspond to the first and second display regions 1301 and 1302 of the display panel 130. The circuit board 140 is electrically coupled to the main circuit board 120 by the first flexible circuit 124. Thus, control signals for the keys 1403 provided on the circuit board 140 can be properly transmitted to the main circuit board 120 through the first flexible circuit 124. The detailed structure of the keys 1403 will be explained later.

A third opening 1501 is formed in a region of the pad 150 corresponding to the first opening 1401 of the circuit board 140. In addition, the pad 150 includes a plurality of transparent windows 1502 formed in regions corresponding to the openings 1402, and a plurality of pressing units 1503 formed on the regions on sides of the transparent windows 1502 corresponding to the keys 1403. The pad 150 further includes a pad body 1500. In other words, the plurality of pressing units 154 are formed on regions corresponding to the keys 1403 of the circuit board 140. Predetermined characters, numbers, and special symbols may be previously formed on the surfaces of the pressing units 1503 by methods such as intaglio, engraving, or printing. In addition, the transparent windows 1502 may be closed by any one selected from a transparent resin, a transparent glass, and the like. When a user presses the pressing unit 1503, the key 1403 is operated. Then, a control signal for the key 1403 can be transmitted to the main circuit board 120 through the first flexible circuit 124. Thus, the user touches images that may be differently formed on the first display region according to the selected function through the touch panel 1301*a* as described above. Therefore, the user interface environment is improved. In addition, other functions are performed by pressing the pressing units 1503. Thus, stability of inputting is prominently improved. The sectional structures of the pressing unit 1503 and pad 1500 will be explained in more detail below.

The cover 160 includes a plurality of fourth openings 1604 formed in regions corresponding to the transparent windows 1502 and pressing units 1503 of the pad 150, a fifth opening 1605 formed in a region corresponding to the third opening 1501 of the pad 150. The cover 160 further includes a cover body 1600. Thus, the first and second display regions 1301 and 1302 of the display panel 130 are exposed to the outside through the fourth and fifth openings 1604 and 1605 of the cover 160. Thus, the user can operate the pressing units 1503 exposed through the fourth openings 1604 of the cover, or input a predetermined instruction by touching the touch panel 1301a exposed through the fifth opening 1605. In addition, the fourth and fifth openings 1604 and 1605 may be closed by any one selected from a transparent resin, a transparent glass, and the like. Thus, the pixels formed in the first and second display regions 1301 and 1302 can be better protected.

Figure 2:
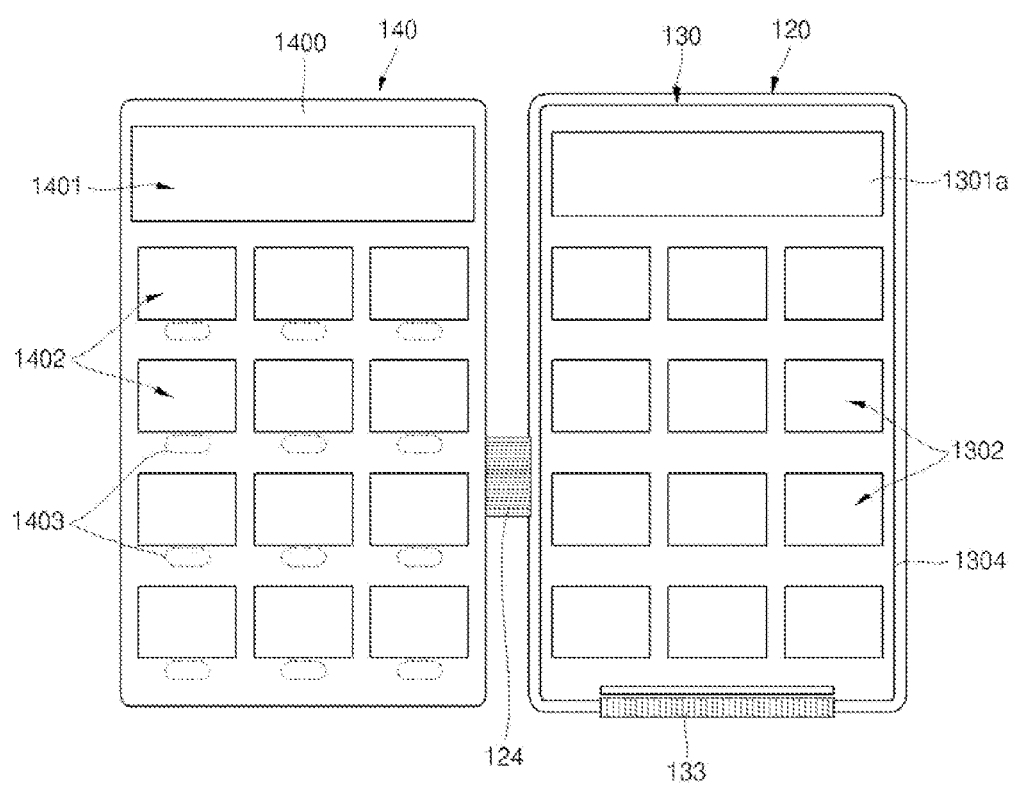
FIG. 2 is a plan view illustrating a state that a display panel is mounted on a main circuit board of the display for the keypad.

FIG. 2 is a plan view illustrating the display panel 130 mounted on the main circuit board 120 of the display 100 for the keypad. Referring to FIG. 2, the display panel 130 is mounted on the main circuit board 120. The display panel 130 is electrically coupled to the main circuit board 120 through the second flexible circuit 133. In addition, the main circuit board 120 is electrically coupled to the circuit board 140 through the first flexible circuit 124. Here, the first display region 1301 of the display panel 130 and the plurality of display regions 1302 are formed at positions corresponding to the first and second openings 1401 and 1402 formed on the circuit board 140.

Figure 3:
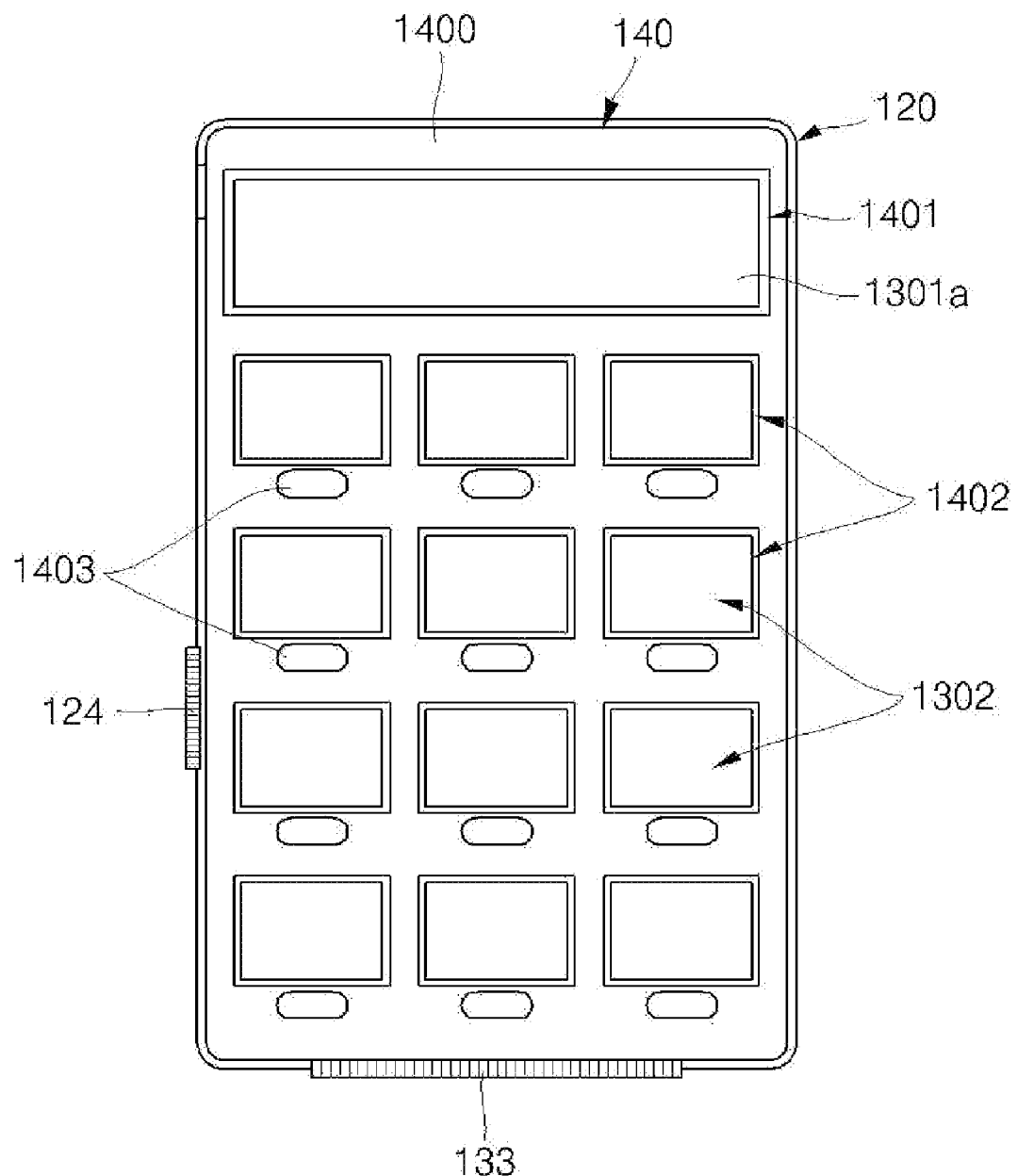
FIG. 3 is a plan view illustrating a state that the display panel and a circuit board are sequentially mounted on the main circuit board of the display for the keypad.

FIG. 3 is a plan view illustrating the display panel 130, a touch panel 1301a, and a circuit board mounted on the main circuit board 120 of the display 100 for the keypad. Referring to FIG. 3, the display panel 130, the touch panel 1301a, and the circuit board 140 are sequentially mounted on the main circuit board 120. The circuit board 140 is electrically coupled to the main circuit board 120 through the first flexible circuit 124. The touch panel 1301a formed in the first display region 1301 of the display panel 130 is exposed to the outside through the first opening 1401 formed in the circuit board 140. Thus, the user can operate the keys while watching various characters, numbers, specific symbols, still images, and moving images displayed on the first and second display regions 1301 and 1302 through the first and second openings 1401 and 1402 formed in the circuit board 140. Here, the keys 1403 are formed at edges of the second openings 1402 of the circuit board 140.

Figure 4:
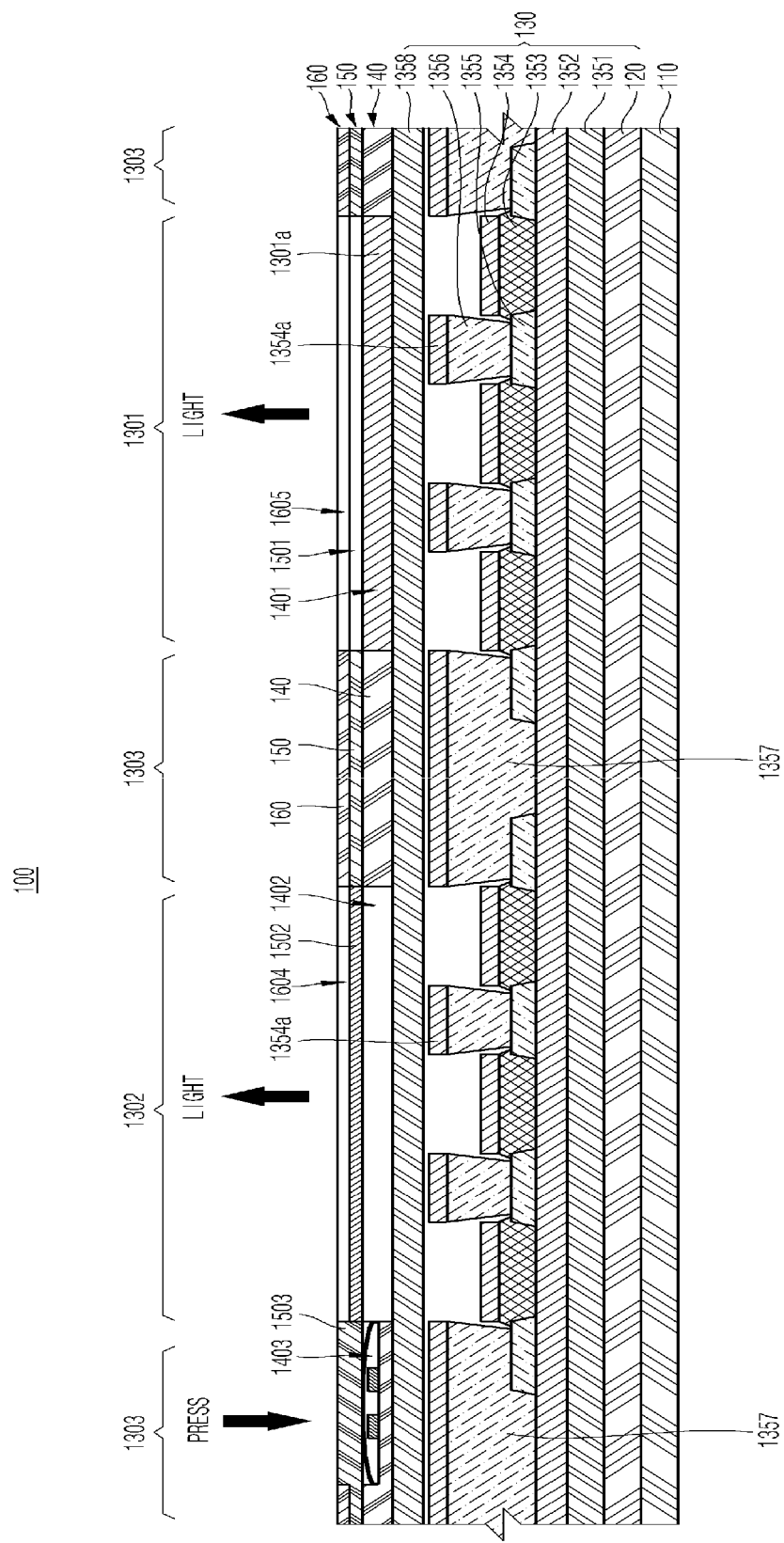
FIG. 4 is a sectional view taken along IV-IV' line of FIG. 1.

FIG. 4 is a schematic sectional view taken along line IV-IV' of FIG. 1. The display 100 for the keypad shown in FIG. 4 is not exactly proportional to actual size, thickness, and length and exaggerated or simplified for comprehension. For example, six emitting layers 1353 and six second electrodes 1354 are shown in the display panel 130 of FIG. 4. However, more or fewer emitting layers 1353 and second electrodes 1354 may be formed. In addition, the key 1403 of FIG. 4 is shown to have a length roughly similar to a length of the emitting layers 1353 or second electrodes 1354, but may be actually much larger or smaller. In addition, the display panel 130 shown in FIG. 4 is shown for a passive matrix organic light emitting display as an example but not limited thereto.

The display panel 130 shown in FIG. 4 includes a first substrate 1351, a first electrode 1352 formed on the first substrate 1301, the emitting layers 1353 formed on a first electrode 1352, the second electrodes 1354 formed on the emitting layers 1353, an insulation layer 1355 formed between the second electrodes 1354, first separators 1356 formed on the insulation layer 1355, and second separators 1357 formed on the first electrode 1352 and having a width larger than that of the first separator 1356.

Here, the region provided with the first electrode 1352, the emitting layer 1353, the second electrodes 1354, and the first separators 1356 may be defined as the display region. More particularly, the display region provided with the touch panel 1301a may be defined as the first display region 1301, and the other display region may be defined as the second display region 1302.

In addition, the region provided with the first electrode 1352, the second electrode 1354, and the second separators 1357 without the emitting layer 1353 may be defined as the non-display region 1303. Thus, predetermined images (various characters, numbers, specific symbols, still images, and moving images) are displayed through the first and second display regions 1301 and 1302, but no image is displayed through the non-display region 1303. The second separators 1357 are formed in the non-display region 1303.

The first substrate 1351 may be any one selected from glass, plastic resin, nano complex, metal and the like, but the first substrate 1351 is not limited thereto.

The first electrode 1352 may be formed on a silicon oxide layer, a silicon nitride layer, or a silicon oxide nitride layer formed on the first substrate 1351, or may be formed directly on the first substrate 1351. The first electrode 1352 may be formed of any one selected from ITO (indium tin oxide), ITO/Ag, ITO/Ag/ITO, ITO/Ag/IZO (indium zinc oxide), and the like, but the first electrode 1352 is not limited thereto. It is desirable that the first electrode 1352 is formed of a material having a large work function and a lower hole injection barrier than the emitting layers 1353. In addition, the silver (Ag) reflects light from the emitting layers 1353 toward the upper surface in a top-emission method.

The emitting layers 1353 are formed on the first electrode 1352. The emitting layers 1353 may emit red, green, or blue light, or may emit monochromatic light, but the emitting layers 1353 are not limited thereto. In addition, the emitting layers 1353 may include a hole transport layer (HTL), an organic emitting layer (EML), and an electron transport layer (ETL), where holes easily move through the hole transport layer (HTL), and the organic emitting layer (EML) emits light of a predetermined color through combination of electrons and holes to form excitons, and electrons easily move through the electron transport layer (ETL). In addition, an electron injecting layer (EIL) may be formed therein to improve an electron injection efficiency, and a hole injecting layer (HIL) may be further formed therein to improve a hole injection efficiency, but aspects of the present invention are not limited thereto.

The second electrodes 1354 may be formed on the emitting layer 1353 in a direction intersecting the first electrode 1352. The second electrodes 1354 may be formed of any one selected from Al, LiF, MgAg alloy, MgCa alloy, and the like, but the second electrodes 1354 are not limited thereto. However, when the top-emission method is used, a thickness of the Al should be very thin. However, when the Al is thin, resistance is increased and an electron injection barrier may become larger. Thus, it is desirable that any one of LiF, MgAg alloy or MgCa alloy having a lower electron injection barrier than the Al is used as the second electrode 1354.

The insulation layer 1355 may be formed between the emitting layers 1353 so as to isolate the emitting layers 1353 physically and electrically from each other. The emitting layers 1353 may be formed of any one selected from polyimide and the like, but the emitting layers 1353 are not limited thereto.

The first separators 1356 are formed between the second electrodes 1354 and the emitting layers 1353 so as to physically isolate the second electrodes 1354. The first separators 1356 are formed thicker than the emitting layers 1353, thereby allowing the second electrodes 1354 to be physically isolated from each other. In addition, the first separators 1356 may be formed in trapezoid shapes whose upper edges are longer than the lower edges, but the first separators 1356 are not limited thereto. In other words, the first separators 1356 may be formed in a trapezoid shape whose lower edge is longer than the upper edge, or the first separators 1356 may be formed in a square pillar shape. In addition, the first separators 1356 may be formed by exposure and development of photoresist, but the first separators 1356 are not limited thereto.

The second separators 1357 are formed at the edges of the display regions 1301 and 1302. In other words, the second separators 1357 may be respectively formed on the edges of the emitting layers 1353. The second separators 1357 may be formed wider than the first separators 1356. The non-display region 1303 may be defined by the second separators 1357. In other words, the region provided with the emitting layers 1353 and first separator 1356 may be defined as the first and second display regions 1301 and 1302, and the region provided with the second separator 1357 may be defined as the non-display region 1303. On the other hand, second electrodes 1354a are further formed on the first and second separators 1356 and 1357 as shown in the drawing. However, the second electrode 1354a is formed according to a particular manufacturing process, but aspects of the present invention are not limited thereto. In other words, the second electrode 1354a may not be formed on the second separators 1357.

On the other hand, a transparent second substrate 1358 may formed on the first and second separators 1356 and 1357 in the first and second display regions 1301 and 1302 and the non-display region 1303. The second substrate 1358 may be in contact with or not in contact with the first and second separators 1356 and 1357. The second substrate 1358 prevents external moisture and dust from reaching the emitting layer 1353. The second substrate 1358 may also be referred to a sealing substrate.

The circuit board 140 having the first and second openings 1401 and 1402 and key 1403 is provided on the second substrate 1358. The first and second openings 1401 and 1402 of the circuit board 140 have similar sizes as the first and second display regions 1301 and 1302 formed in the display panel 130. The touch panel 1301a formed on the display panel 130 fills the first opening 1401. A detailed construction of the touch panel 1301a will be explained below.

In addition, the pad 150 including the pressing units 1503 is disposed on the circuit board 140. The transparent window 1502 of the pad 150 has a similar size as the second opening 1402 of the circuit board 140. The third opening 1501 of the pad 150 has a similar size as the touch panel 1301a and the first opening 1401 of the circuit board 140.

The cover 160 having the fourth and fifth openings 1604 and 1605 is disposed on the pad 150. The pressing units 1503 formed on the pad 150 are exposed to the outside through the fourth opening 1604. In addition, the touch panel 1301a formed on the display panel 130 is exposed to the outside through the fifth opening 1605.

On the other hand, at least one of the second openings 1402, transparent windows 1502, and fourth openings 1604 may be closed by any one selected from a transparent resin, a transparent glass, and the like to protect the first and second display regions 1301 and 1302 from external environments.

As described above, the keys 1403 formed on the circuit board 140 of the display 100 for the keypad are provided in the regions corresponding to the non-display region 1303 of the display panel 130. Actually, the keys 1403 of the circuit board 140 are formed only in the region corresponding to the second separators 1357. The second separators 1357 are formed thicker than the emitting layers 1353 formed in the first and second display regions 1301 and 1302 and wider than the first separator 1356 formed on the first and second display regions 1301 and 1302 as described above. Thus, even if the key 1403 is pressurized when the user presses the pressing unit 1503 of the pad 150, the second substrate 1358 and the second separator 1357 under the second substrate 1358 distribute the pressure sufficiently to protect the display regions 1301 and 1302. Therefore, damage or display quality degradation of the display regions 1301 and 1302 does not occur in spite of the user's key operation.

The display 100 for the keypad shown in FIG. 4 may further include a case 110 and a main circuit board 120 mounted on the case 110 as described above.

Figure 5A:
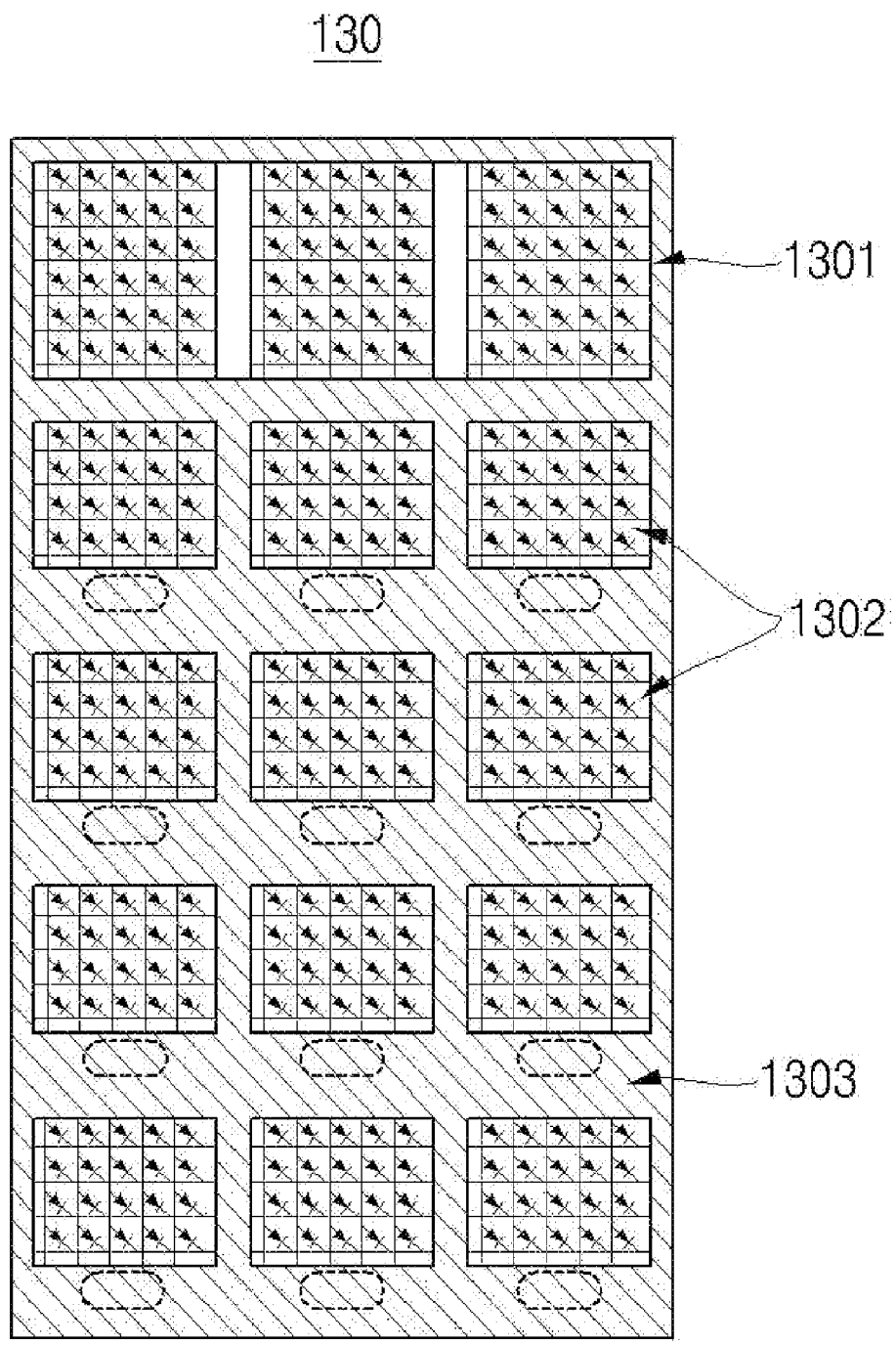
FIGS. 5A and 5B are schematic plan views illustrating display regions and non-display region formed on the display panel of the display for the keypad.
Figure 5B:
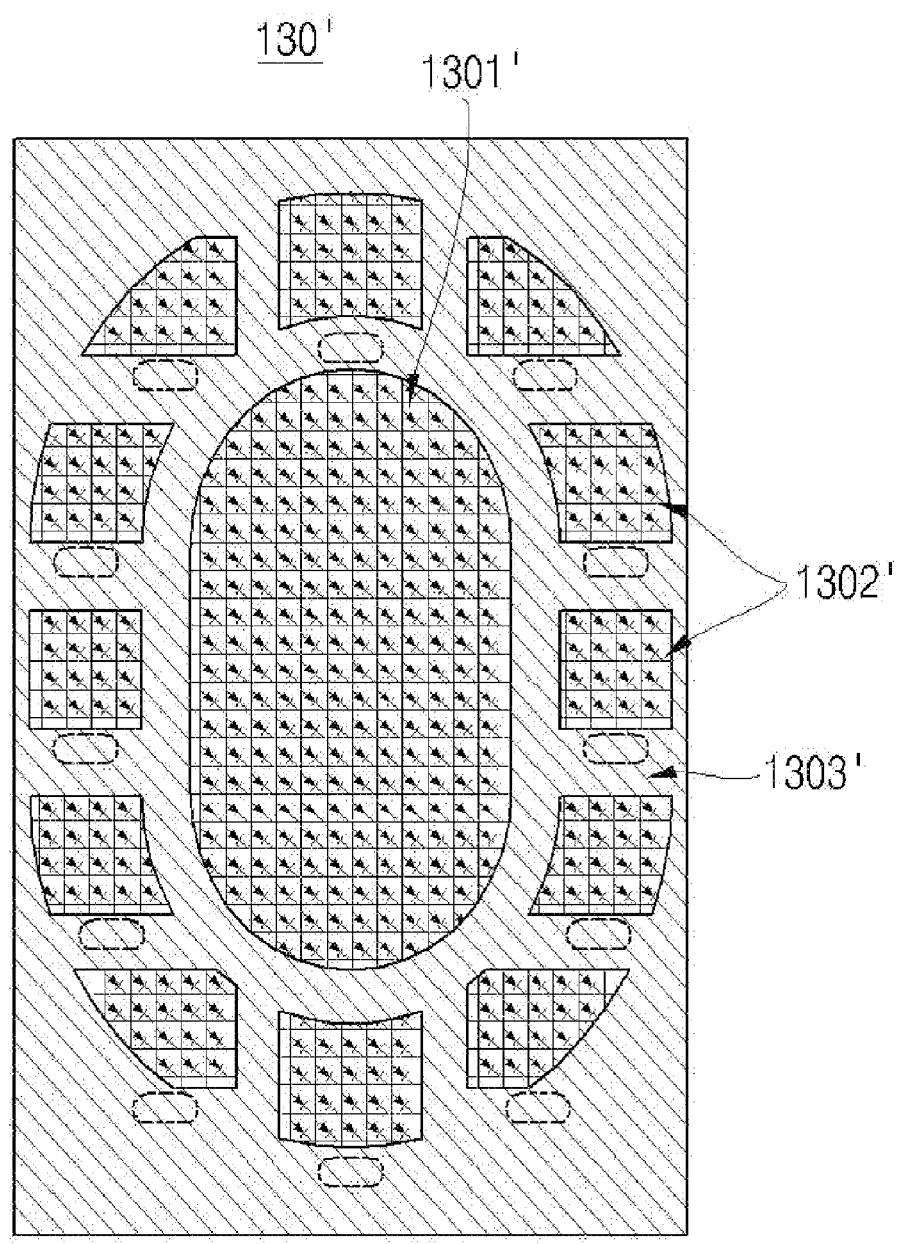

FIGS. 5A and 5B are schematic plan views illustrating the non-display region and the display regions formed on the display panel of the display for the keypad. Referring to FIG. 5A, the display panel 130 is formed of the non-display region 1303 and the first and second display regions 1301 and 1302 displaying characters, numbers, specific symbols, still images, and moving images. Of course, the plurality of second display regions 1302 may be formed generally in a symmetrical structure. For example, the second display regions 1302 may be formed in a matrix having rows and columns. In addition, as shown in FIG. 5B, the second display region 1302' may be arranged along the outer circumference of the first display region 1301'. In this time, the second display region 1302 may be formed in various shapes such as circular, oval, and polygonal shapes. For example, the second display region 1302' may be formed of a rectangular structure having round corners as shown in FIG. 5B.

According to the structure as described above, the user interface environment can be improved by programming the touch panel 1301a provided on the first display regions 1301 and 1301' so as to perform various functions. For example, as shown in FIG. 5B, various multi-media functions such as rewinding, back-winding, or volume control of music, or image files can be easily performed by one drag by touching the touch panel formed on the first display region 1301' having a structure such as a circular type. Thus, the user interface environment is improved. In addition, pressing units are formed adjacent to the second display regions 1302'. The user can input instructions with a feeling of a sense of pressing. Thus, stability for inputting is prominently improved. In addition, according to the structure as described above, even if the size of the display panel becomes relatively large, electrode resistance and capacitance of the emitting layers are not increased much. In other words, in the arrangement of the first and second display regions 1301 and 1302, the display regions are not formed on the entire display panel. Thus, power consumption can be reduced than a usual display panel of the same size.

On the other hand, oval portions in FIGS. 5A and 5B show regions corresponding to the keys 1403 of the circuit board 140. In other words, the keys 1403 of the circuit board 140 pressed by the user are the regions corresponding to the non-display region 1303. That is, the regions in the display panels 130 and 130' corresponding to the keys 1403 of the circuit board 140 are the regions where pixels are not formed.

Figure 6:
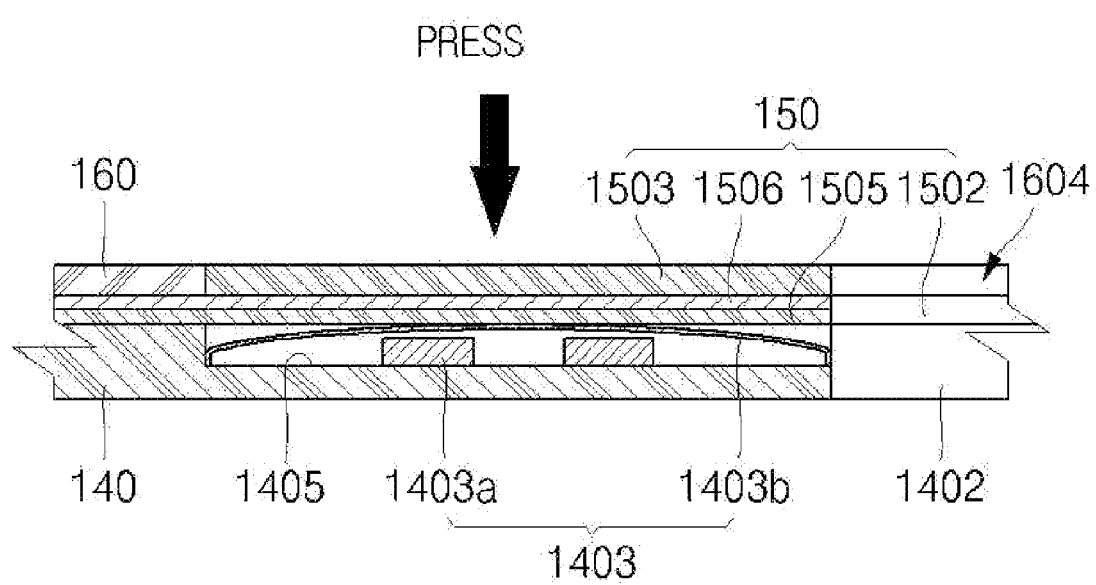
FIG. 6 is a magnified sectional view illustrating a key of the display for the keypad and a structure around it.

FIG. 6 is a magnified sectional view illustrating the key 1403 and the peripheral structure of the display 100 for the keypad. Referring to FIG. 6, the key 1403 provided in the region corresponding to the non-display region 1303 adjacent the second display region 1302 of the display panel 130 may be any one selected from, for example, a dome switch and the like, but the key 1403 is not limited thereto. The key 1403 may be formed of at least one conduction pattern 1403a formed on the circuit board 140 and an elastic member 1430b separated from the conduction pattern 1403a. The elastic member 1430b may be a conductor, or may include a conduction layer formed on an inner surface. In addition, it is shown in FIG. 6 that a cavity 1405 is formed in the region of the circuit board 140 where the key 1403 is formed. However, the cavity 1405 may not be formed.

The pad 150 placed on the circuit board 140 may have a multi-layer structure. The pad 150 shown in the drawing is just an example for comprehension, but the pad 150 is not limited thereto. The pad 150 may be formed of an insulation layer 1505 disposed on the circuit board 140 and/or the key 1403, a thin metal layer 1506 disposed on the insulation layer 1505, and the pressing units 1503 formed in the regions corresponding to the keys 1403.

The insulation layer 1505 enables the pad 150 to be stably and closely contacted with the upper part of the circuit board 140 and key 1403, and the metal layer 1506 provides rigidity for the pad 150. The pressing unit 1503 transmits pressing force from the user to the key 1403. The pressing unit 1503 may be formed of resin, metal, and the like, but the pressing unit 1503 is not limited thereto. In addition, the pressing unit 1503 may be projected upward at a predetermined thickness thereby allowing the user to press it easily. The cover 160 is mounted on the pad 150. The pressing unit 1503 of the pad 150 is exposed the fourth opening 1604 formed in the cover 160. Here, the thickness of the pressing unit 1503 may be controlled so as to be formed to a level at, above, or below the pad 150.

Figure 7:
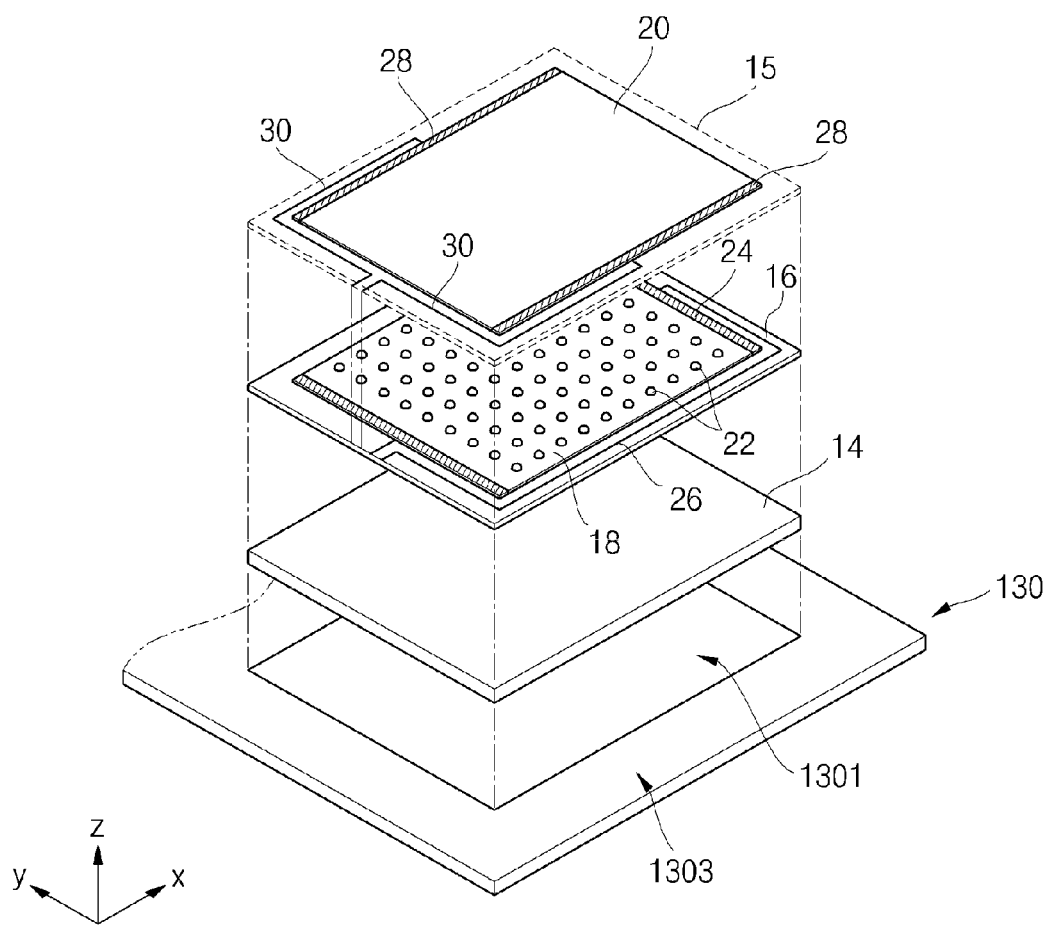
FIG. 7 is an exploded perspective view illustrating a touch panel of the display for the keypad

FIG. 7 is a perspective view illustrating the touch panel 1301a of the display 100 for the keypad. As described above, the touch panel 1301a is provided on the first display region 1301 to provide a user interface that displays images on the first display region 1301. Thus, the user can use a desired function by touching images displayed on the touch panel 1301a in the first display region 1301. The touch panel 1301a may be formed in any one type of resistive, electrostatic capacitive, ultrasonic, and infrared types, but the touch panel 1301a is not limited thereto. In other words, the touch panel of FIG. 7 is illustrated and described as such for comprehension but is not limited thereto.

The touch panel 1301a includes front and rear substrates 15 and 16 arranged to face each other, a first transparent conduction film 18 disposed on the rear substrate 16, a second transparent conduction film 20 provided in the front substrate 15, a plurality of dot spacers 22 disposed between the first and second transparent conduction films 18 and 20 to prevent conduction between the two conduction films 18 and 20. In addition, a protection film (not shown) may be further provided on the front substrate 15 to prevent scratches of the touch panel 1301a.

First electrodes 24 are provided at both ends of the first transparent conduction film 18, for example, at right and left ends facing each other in the horizontal direction of a screen (a direction of x axis of FIG. 7). Each first electrode 24 is connected to a first wire 26. Second electrodes 28 are provided at both ends of the second transparent conduction film 20, for example, at upper and lower ends facing to each other in the vertical direction of a screen (a direction of y axis of FIG. 2). Each second electrode 28 is connected to a second wire 30.

The front substrate 15 may be formed of a film. The rear substrate 16 may be formed of any one of a film, a plastic, and a glass. The first and second transparent conduction films 18 and 20 may be formed of ITO (indium tin oxide) or IZO (indium zinc oxide). The first and second electrodes 24 and 28 may be made of silver (Ag).

The first electrode 24 receives an electrical signal through the first wire 26, and the second electrode 28 receives an electrical signal through the second wire 30. When a user presses one point of the touch panel 12, the first and second transparent conduction films 18 and 20 are contacted to each other, the second transparent conduction film 20 detects a position of the horizontal axis (x axis) by sensing the electrical signal of the first transparent conduction film 18, and the first transparent conduction film 18 detects a position of the vertical axis (y axis) by sensing the electrical signal of the first transparent conduction film 20.

The touch panel 1301a may further include a packed layer 14 under the rear substrate 16. The packed layer 14 reduces load transferred to the display panel 130 from the touch panel 1301a by absorbing a load generated when the user touches the touch panel 1301a. The packed layer 14 is formed of an organic material having a high permeability and adhesive property. The packed layer 14 may include a conventional dry film resist or epoxy group organic materials. The packed layer 14 minimizes degradation of brightness of the display panel 130 and functions as an adhesive layer fixing the display panel 130.

The touch panel 1301a may include a controller and a driver, but such are not shown in FIG. 7. The controller calculates the information of the position touched by the user by digitizing an analog signal transmitted from the touch panel into a digital signal through an A/D converter. The driver moves a pointer on the screen or processes the selected function according to a coordinate signal supplied from the controller in cooperation with an image controller of the display panel 130.

The display 100 for the keypad can perform an exact input function by the pressing units 1503 pressed by the user. The display 100 uses the touch panel 1301a as described above. Thus, the user interface environment is more improved. For example, the user may select specific characters, numbers, specific symbols, still images, and moving images to be displayed in the second display regions 1302 by pressing an icon displayed on the touch panel 1301a, and then select functions designated by the specific characters, numbers, specific symbols, still images, and moving images to be displayed in the second display regions 1302 by pressing the pressing units 1503.

Figure 8:
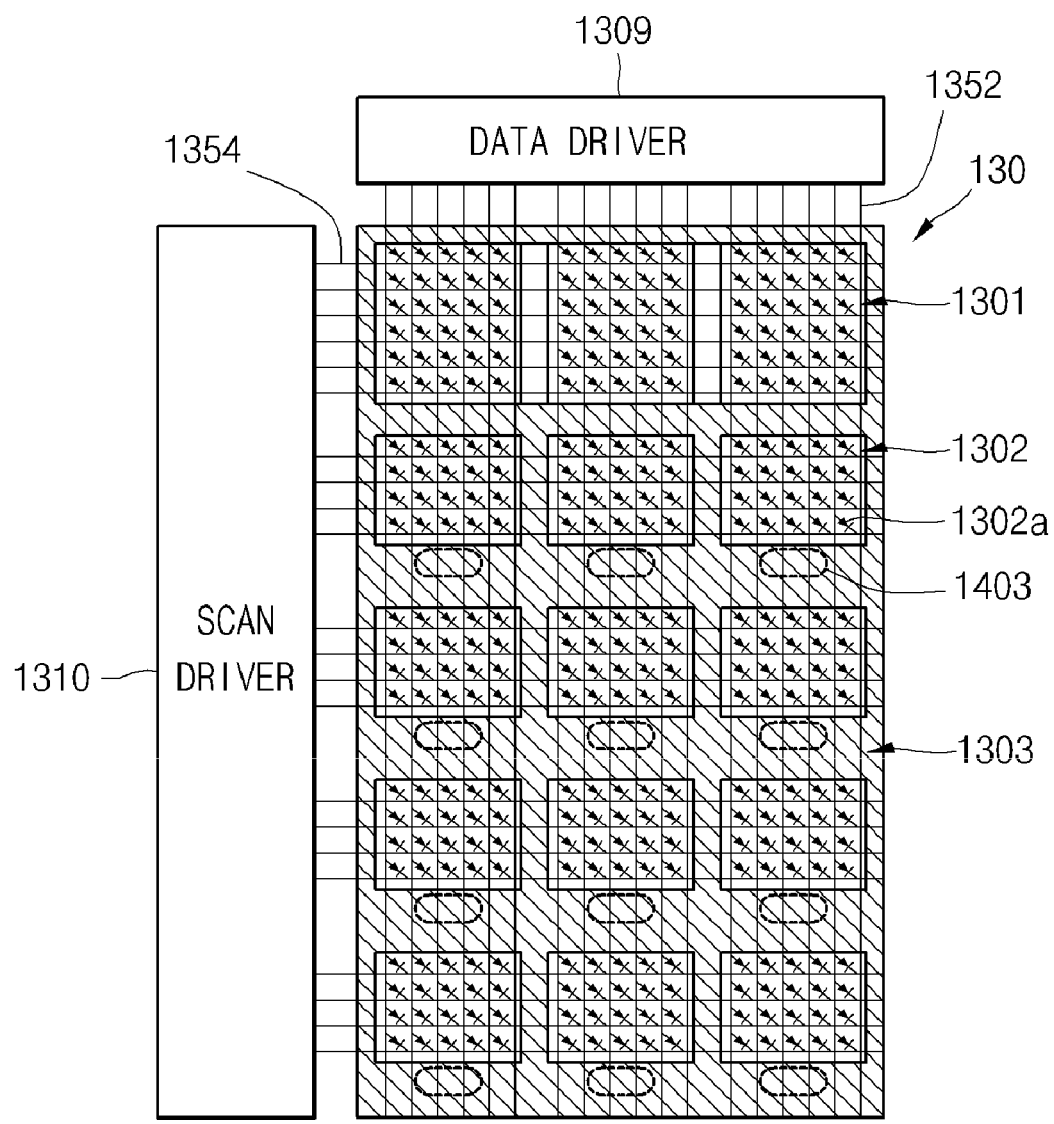
FIG. 8 is a schematic view illustrating an electrical construction of the display panel of the display for the keypad.

FIG. 8 is a block diagram illustrating an electrical construction of the display panel 130 of the display 100 for the keypad. Referring to FIG. 8, the display panel 130 is formed of the non-display region 1303 and of the first and second display regions 1301 and 1302. A plurality of pixels 1302a are formed in the first and second display regions 1301 and 1302. In addition, first and second electrodes 1352 and 1354 may be formed in the first and second display regions 1301 and 1302. In addition, for example, a data driver 1309 may be electrically coupled to the first electrodes 1352 to apply a data signal to the first and second display regions 1301 and 1302, and a scan driver 1310 may be electrically coupled to the second electrode 1354 to apply a scan signal to the first and second display regions 1301 and 1302. The data driver 1309 may be referred to as a source driver or a column driver, and the scan driver 1310 may be referred to as a gate driver or a row driver.

However, pixels may not be formed on the entire display panel 130. In other words, pixels 1302a may be formed only in the first and second display regions 1301 and 1302 as described above and not in the non-display region 1303. Thus, power consumption is decreased and manufacturing yield is increased compared to the case where the display region or pixels are formed on the entire display panel 130. Furthermore, manufacturing cost is saved.

Oval dotted lines in the drawing show regions corresponding to the keys 1403 formed the circuit board 140. As shown in the drawing, the keys 1403 correspond to the non-display region 1303 of the display panel 130. Thus, damage of the first and second display regions 1301 and 1302 and/or degradation of display quality can be prevented when the user operates the keys 1403.

Figure 9:
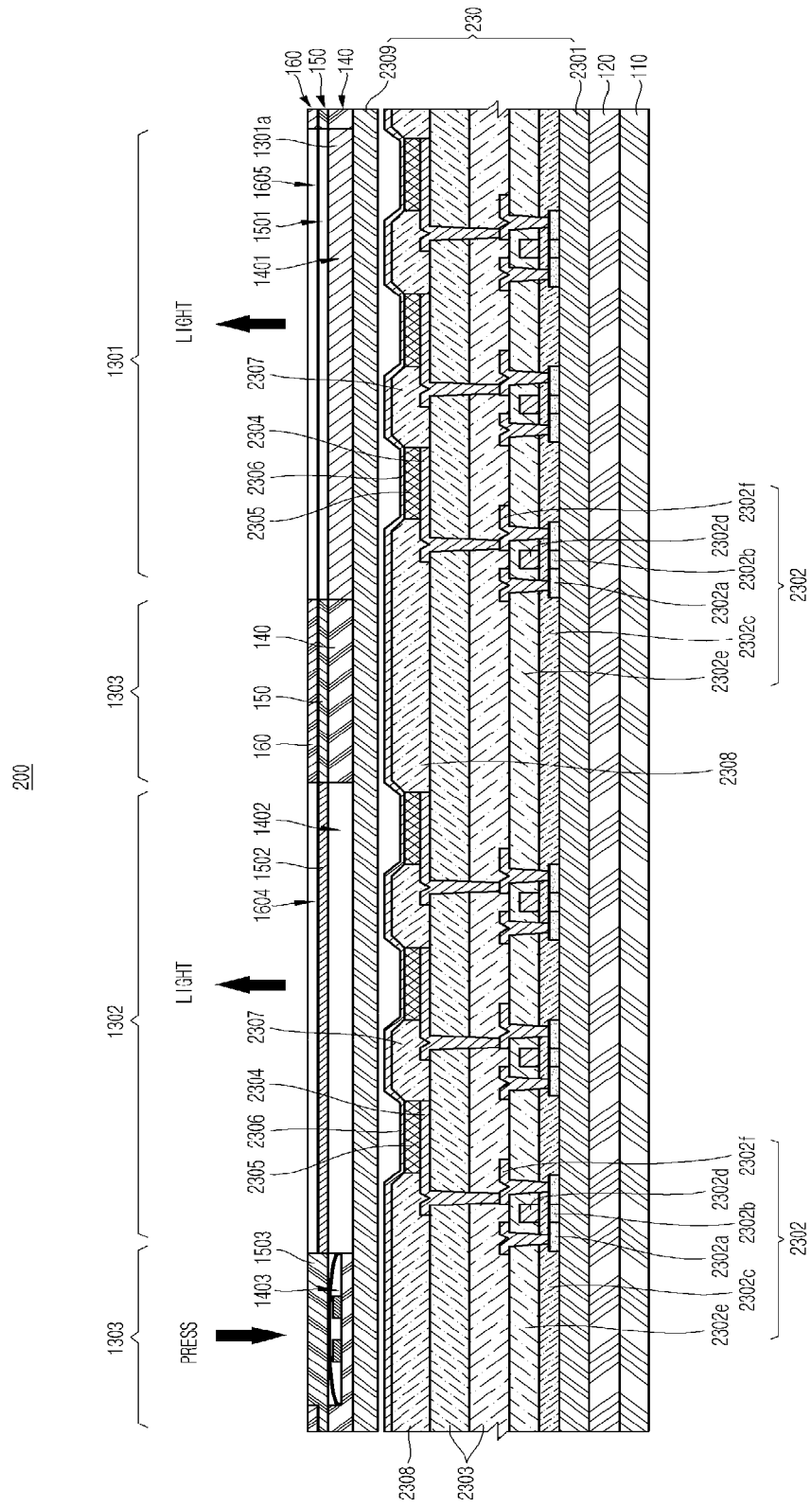
FIG. 9 is a schematic sectional view illustrating a display for a keypad according to another exemplary embodiment of the present invention.

FIG. 9 is a schematic sectional view illustrating a display 200 for a keypad according to another exemplary embodiment of the present invention. In FIG. 9, the same drawing reference numerals are used for the same elements as the embodiment as described above and detailed explanation thereof will be omitted.

The display 200 for the keypad shown in FIG. 9 is not exactly proportional to actual size, thickness, and length, and exaggerated or simplified for comprehension (for example, a capacitor is included, but is omitted from FIG. 9). As a further example, six transistors 2302, six first electrodes 2304, six emitting layers 2305, and six second electrodes 2306 are shown in FIG. 9. However, those may be formed in much more or less numbers. In addition, the key 1403 of the circuit board 140 in FIG. 9 is shown to have a length similar to that of the first electrode 2304 or emitting layer 2305, but may be much larger or smaller.

Referring to FIG. 9, the display panel 230 includes a first substrate 2301, the transistors 2302 formed on the first substrate 2301, an insulation layer 2303 formed on the transistors 2302, the first electrodes 2304 electrically coupled to the transistors 2302, the emitting layers 2305 formed on the first electrodes 2304, the second electrode 2306 formed on the emitting layers 2305, first pixel definition layers 2307 to define a pixel, and second pixel definition layers 2308 formed at the periphery of the first pixel definition layer 2307.

Here, the regions in which the three first electrodes 2304, emitting layers 2305, second electrode 2306, and first pixel defined layers 2307 are formed may be defined as display regions 1301 and 1302. More particularly, the region provided with the touch panel 1301*a* may be defined as the first display region 1301, and the other display region may be defined as the second display region 1302. In addition, the region provided with only the second pixel defined layer 2308 without the emitting layer 2305 may be defined as the non-display region 1303.

The first substrate 2301 may be formed of any one material selected from a glass, a plastic resin, a nano complex, a metal, and the like, but the first substrate 2301 is not limited thereto.

The transistor 2302 may be formed on a silicon oxide layer, a silicon nitride layer, or a silicon oxide nitride layer formed on the first substrate 2301, or may be formed directly on the first substrate 2301. The transistor 2302 may be a thin film transistor, and have source/drain regions 2302*a* and a channel region 2302*b*. A gate insulation layer 2302*c* may be formed on the surface of the transistor 2302, and a gate electrode 2302*d* may be formed on the gate insulation layer 2302*c* in the region corresponding to the channel region 2302*b*. In addition, a dielectric layer 2302*e* may be formed to cover the gate electrode 2302*d*, and a source/drain electrode 2302*f* electrically coupled to the source/drain region 2302*a* may be formed on the dielectric layer 2302*e*. Here, the structure of the transistor 2302 may be any one selected from the conventional structures of a thin film transistor, for example, an inverted coplanar structure, a staggered structure, an inverted staggered structure, and the like, but the transistor 2302 is not limited thereto.

The insulation layer 2303 is formed on the surface of the transistor 2302. The insulation layer 2303 prevents moisture from permeating into the transistor 2302 and simultaneously planarizes the surface. The insulation layer 2303 may be any one selected from an organic layer, an inorganic layer, and the like or mixture thereof but not limited thereto.

The first electrode 2304 may be formed on the insulation layer 2303, and may be electrically coupled to the source/drain electrode 2302*f* of the transistor 2302. The first electrode 2304 may be formed of any material selected from ITO, ITO/Ag, ITO/Ag/ITO, ITO/Ag/IZO and the like, but the first electrode 2304 is not limited thereto. The first electrode 2304 has been also explained in the above description, and thus a detailed explanation will be omitted.

The emitting layer 2305 may be formed on the first electrode 2304. Actually, the emitting layer 2305 may be formed of a hole transport layer, an organic emitting layer, and an electron transport layer. Such formation of the emitting layer 2305 has been explained in the above description, and thus detailed explanation will be omitted.

The second electrode 2306 may be formed on the emitting layer 2305. The second electrode 2306 may be any material selected from Al, LiF, MgAg alloy, MgCa alloy, and the like, but the second electrode 2306 is not limited thereto. The second electrode 2306 has also been explained in the above description, and thus detailed explanation will be omitted.

The first pixel definition layers 2307 are formed between the emitting layers 2305 so as to isolate the emitting layers 2305 physically and electrically from each other. The first pixel definition layers 2307 are formed thicker than the emitting layers 2305 to ensure that the emitting layers 2305 are physically and electrically isolated from each other. In addition, the first pixel definition layers 2307 may be formed in trapezoid shapes whose upper edge is shorter than the lower edge, but are not limited thereto. In addition, the first pixel definition layers 2307 may be formed by exposure and development of polyimide, but are not limited thereto.

The second pixel definition layers 2308 may be formed at edge of the emitting layers 2305 that are formed in the display regions 1301 and 1302. The second pixel definition layers 2308 may be formed wider than the first pixel definition layers 2307. The non-display region 1303 is defined by the second pixel definition layers 2308. On the other hand, a common second electrode 2306 may be formed on the first and second pixel definition layers 2307 and 2308, but aspects of the present invention are not limited thereto.

A transparent second substrate 2309 is formed on the first pixel and second pixel definition layers 2307 and 2308, which form the non-display region 1303 and display regions 1301 and 1302. The second substrate 2309 may be in contact with or not in contact with the first and second pixel definition layers 2307 and 2308. The second substrate 2309 prevents external moisture and dust from reaching the emitting layer 2305.

A circuit board 140 having the first and second openings 1401 and 1402 and keys 1403 is provided on the second substrate 2309, and simultaneously, the touch panel 1301*a* is placed to fill the first opening 1401. The pad 150 having transparent windows 1502, the third opening 1501 formed in the pad 150 corresponding to the first opening 1401, and pressing units 1503 is placed on the circuit board 140, and a cover 160 is placed on the pad 150. The first and second display regions 1301 and 1302 of the display panel 130 are exposed to the outside through the fourth and fifth openings 1604 and 1605 of the cover 160. Such structure has been explained in the above description, and thus detailed explanation will be omitted.

As described above, the display panel 230 is divided into the non-display region 1303 and the display regions 1301 and 1302. The keys 1403 formed on the circuit board 140 are located in the regions corresponding to the non-display region 1303 of the display panel 230. The keys 1403 of the circuit board 140 may be formed in the region corresponding to the second pixel definition layer 2308. The second pixel definition layer 2308 may be formed thicker than the emitting layer 2305 formed on the display regions 1301 and 1302, and may be formed wider than the first pixel definition layers 2307 formed on the display regions 1301 and 1302 as described above. Thus, even if the key 1403 is pressurized when the user presses the pressing unit 1503 of the pad 150, the second substrate 2309 and the second pixel definition layer 2308 under the second substrate 2309 may sufficiently endure the pressure. Therefore, damage or display quality degradation of the display regions 1301 and 1302 does not occur even if the user presses the key 1403 excessively. Further, the circuit board 140 includes the substrate body 1400, the pad 150 further includes the pad body 1500, and the cover 160 further includes the cover body 1600.

The main circuit board 120 and the case 110 may also be included. Such structure has been explained in the above description, and thus detailed explanation will be omitted.

Figure 10:
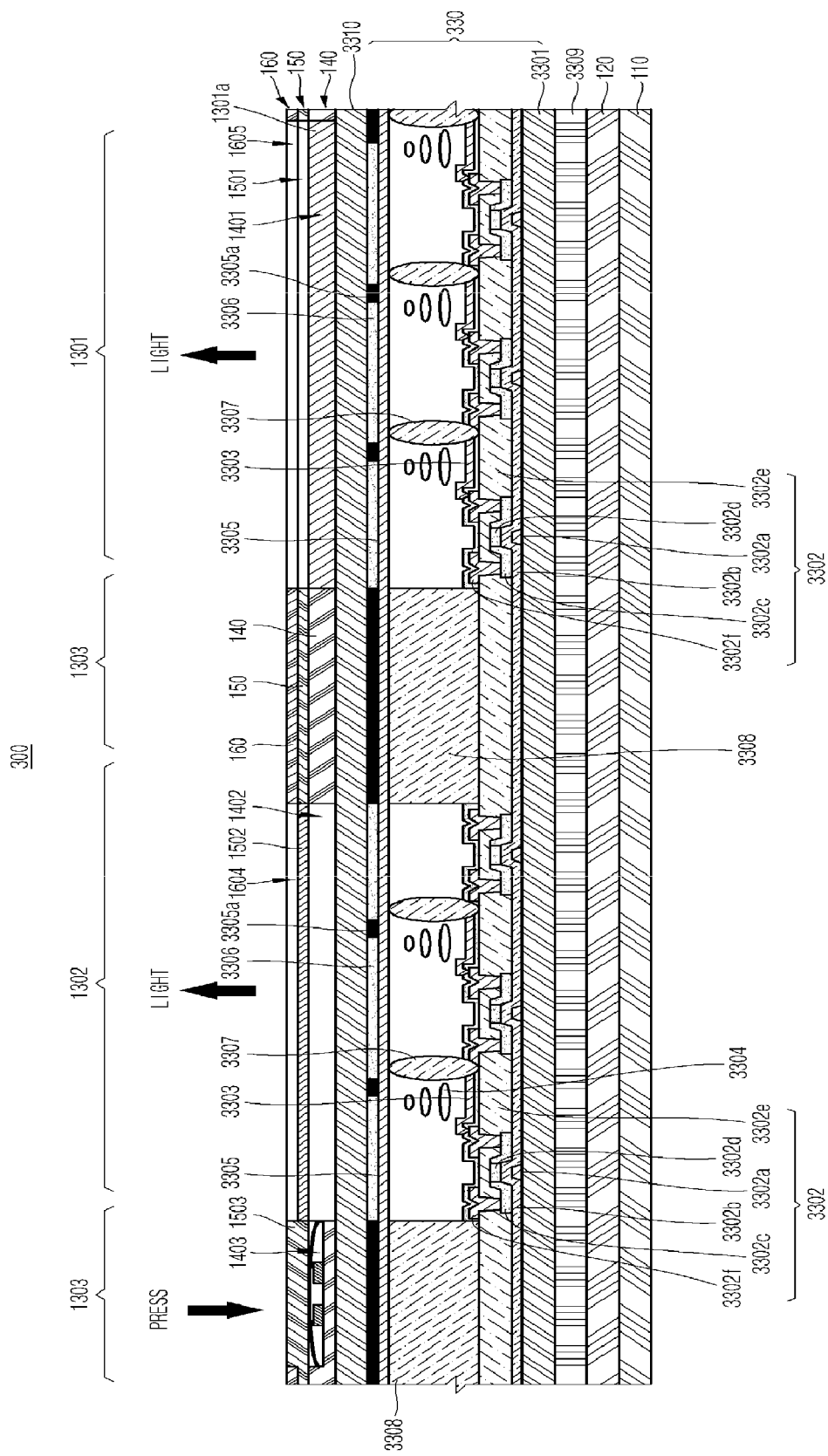
FIG. 10 is a schematic sectional view illustrating a display for a keypad according to a still another exemplary embodiment of the present invention.

FIG. 10 is a schematic sectional view illustrating a display 300 for a keypad according to a still another exemplary embodiment of the present invention. In FIG. 10, the same drawing reference numerals are used for the same elements as the embodiments described above and a detailed explanation thereof will be omitted. The display 300 for the keypad shown in FIG. 10 is not exactly proportional to actual size, thickness, and length, and exaggerated or simplified for comprehension (for example, a capacitor is included, but omitted from FIG. 10). Moreover, only three transistors 3302, three first electrodes 3303, a few liquid crystals 3304, and one of the second electrodes 3305 are shown in each of the first and second display regions 1301 and 1302 in FIG. 10. However, those may be formed in more or less numbers. In addition, the width of the key 1403 of the circuit board 140 is shown to be similar to that of one color filter 3306 in FIG. 10, but actually, may be much larger or smaller. Moreover, a display panel 330 according to aspects of the present invention may be a liquid crystal display but is not limited thereto.

Referring to FIG. 10, the display panel 330 includes a first substrate 3301, the transistors 3302 formed on the first substrate 3301, the first electrodes 3303 electrically coupled to the transistors 3302, the liquid crystals 3304 formed on the first electrode 3303, the second electrode 3305 formed on the liquid crystals 3304, the color filter 3306 disposed on the second electrode 3305, first spacers 3307 to define each pixel, and second spacers 3308 formed at the periphery of the second display regions 1302. Here, the region provided with the transistors 3302, first electrodes 3303, liquid crystals 3304, second electrode 3305, color filters 3306, and first spacers 3307 may be defined as display regions 1301 and 1302. More particularly, a portion provided with a touch panel 1301a may be defined as a first display region 1301 and the other region may be defined as a second display region 1302. In addition, the region provided with the second spacer 3308 may be defined as a non-display region 1303.

The first substrate 3301 may be any one material selected from a glass, a plastic resin, a nano complex, a metal, and the like but is not limited thereto.

The transistor 3302 may be formed on a silicon oxide layer, a silicon nitride layer, or a silicon oxide nitride layer formed on the first substrate 3301 or may be formed directly on the first substrate 3301. For example, a gate electrode 3302a may be formed on the surface of the first substrate 3301 and a gate insulation layer 3302b may be formed on the surface of the gate electrode. Source/drain regions 3302c and a channel region 3302d may be formed on the gate insulation layer 3302b. In addition, an insulation layer 3302e may be formed on the surfaces of the source/drain regions 3302c and channel region 3302d. In addition, source/drain electrodes 3302f may be electrically coupled to the source/drain regions 3302c and be disposed on the insulation layer 3302e. The transistor 3302 may be actually a thin film transistor of various structures but is not limited thereto.

The first electrode 3303 may be electrically coupled to the source/drain electrodes 3302f of the transistor 3302. The first electrode 3303 may be formed of any one selected from ITO, ITO/Ag, ITO/Ag/ITO, ITO/Ag/IZO, and the like but is not limited thereto.

The liquid crystal 3304 may be formed on the first electrode 3303. The crystallization direction of the liquid crystal 3304 is changed according to a magnitude of electric field formed between the first and second electrodes 3303 and 3305, thereby allowing a light transmittance to be changed.

The second electrode 3305 may be formed on the upper region facing the first electrode 3303. The second electrode 3305 may be connected to all of the pixels of a display region but is not limited thereto. The second electrode 3305 may be formed of any one selected from ITO, ITO/Ag, ITO/Ag/ITO, ITO/Ag/IZO, and the like but is not limited thereto.

The color filter 3306 may be formed on the second electrode 3305. The color filter 3306 transmits red, green, or blue light from a backlight 3309 to the outside. A black matrix 3305a may be formed in the color filter 3306 so as to divide light into red, green and blue light.

The first spacer 3307 is placed between the first and second substrate 3301 and 3310 to maintain a proper distance therebetween.

The second spacer 3308 may be formed at peripheries of the second display regions. The second spacer 3308 may be formed wider than the first spacer 3307. In other words, the regions in which the plurality of first spacers 3307 is formed are the display regions 1301 and 1302, and the regions in which the second spacers 3308 are formed are the non-display regions 1303.

The second substrate 3310 may be formed on the first and second spacers 3307 and 3308 which form the display regions 1301 and 1302 and non-display region 131, and the second substrate 3310 may be transparent. The second substrate 1308 may be in contact with or not in contact with the first and second spacers 3307 and 3308. The second substrate 3310 prevents external moisture and dust from reaching the liquid crystal 3304.

The circuit board 140 having the first and second openings 1401 and 1402 and the keys 1403 is provided on the second substrate 3310, and a touch panel 1301a is disposed on the second substrate 3310 to fill the first opening 1401. A pad 150 having transparent windows 1502 and pressing units 1503 is placed on the circuit board 140, and a cover 160 is provided on the pad 150. Further, the circuit board 140 includes the substrate body 1400, the pad 150 further includes the pad body 1500, and the cover 160 further includes the cover body 1600.

As described above, the display panel 330 is divided into the non-display region 1303 and the display regions 1301 and 1302. The keys 1403 formed on the circuit board 140 are located in the regions corresponding to the non-display region 1303 of the display panel 330. The keys 1403 of the circuit board 140 may be formed on the second spacer 3308. The second spacers 3308 are formed wider than the first spacer 3307 formed in the display regions 1301 and 1302 as described above. Thus, even if the key 1403 is pressurized when the user presses the pressing unit 1503 of the pad 150, the second substrate 3310 and the second spacers 3308 under the second substrate 3310 endure the pressure. Therefore, damage or display quality degradation of the display region 132 does not occur even if the user presses the key 1403 excessively.

A backlight 3309 may be formed under the first substrate 3301. A main circuit board 120 and a case 110 may also be included. Such structure has been explained in the above description, and thus detailed explanation will be omitted.

Figure 11A:
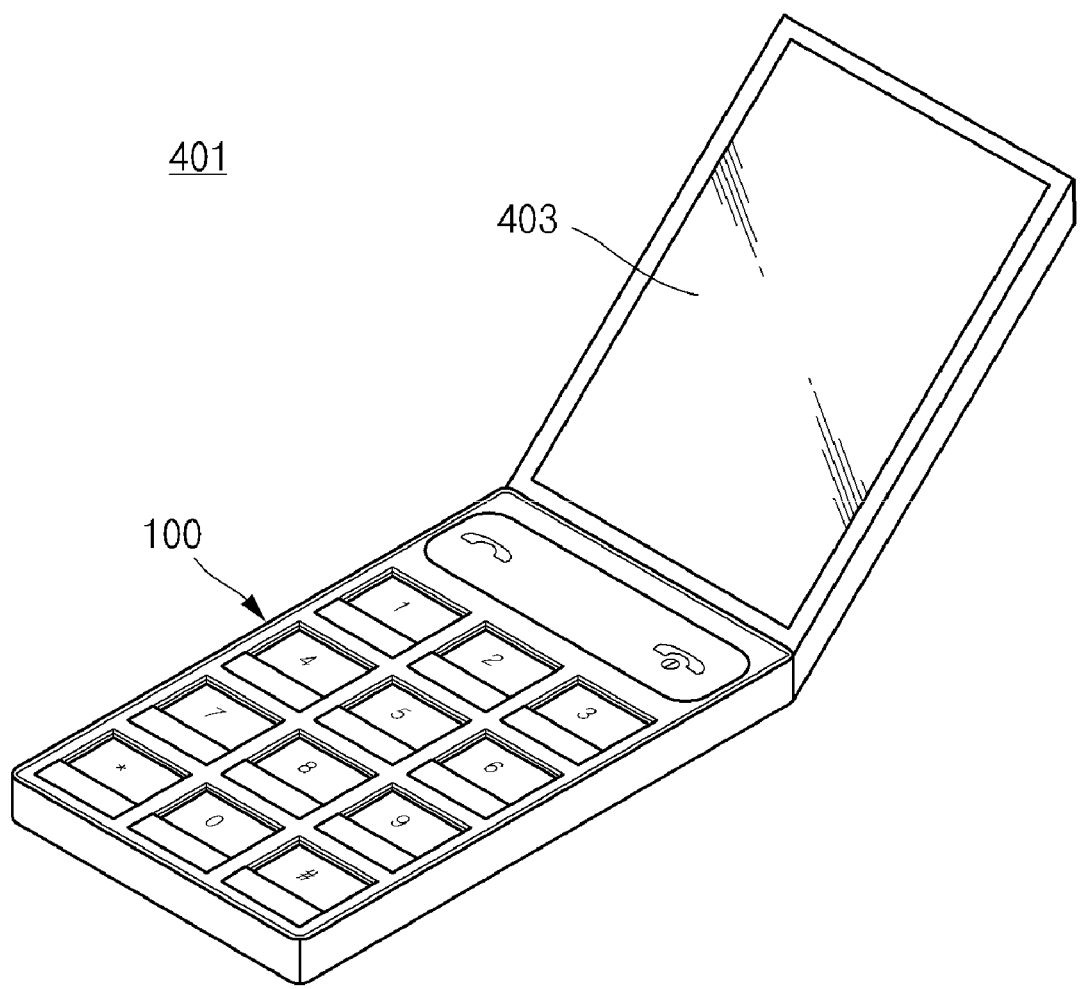
FIGS. 11A and 11B are schematic perspective views illustrating examples of an electronic device having the display for the multi-function keypad.
Figure 11B:
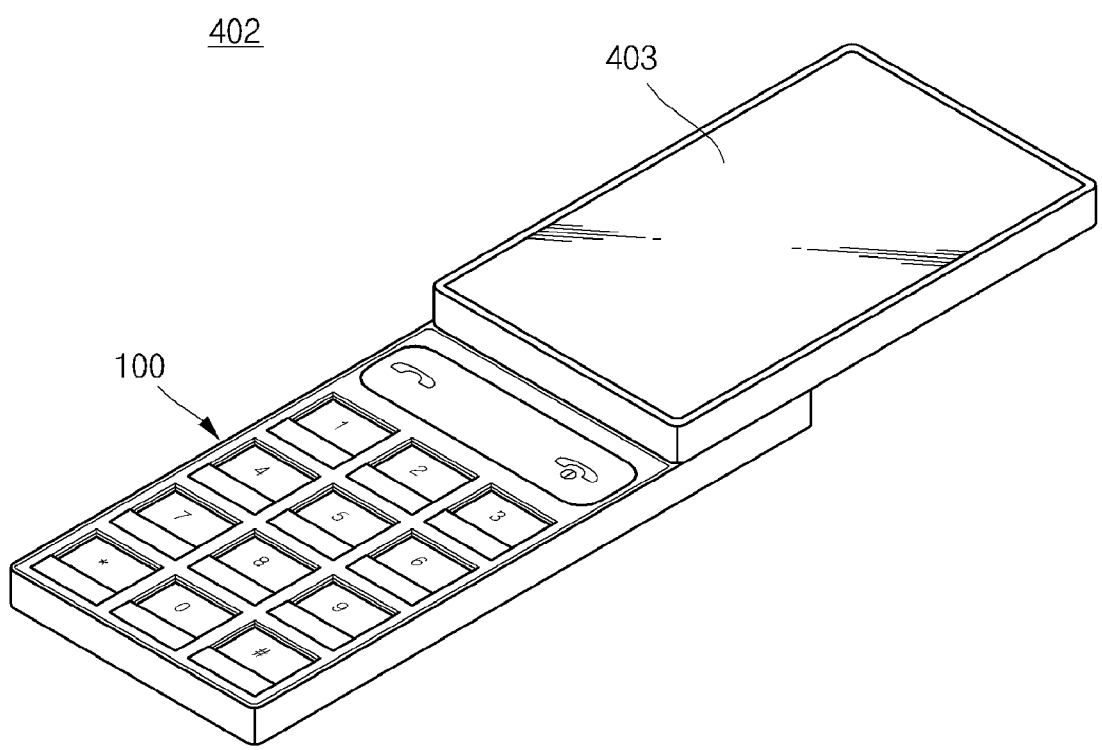

FIGS. 11A and 11B are perspective views illustrating examples of electronic devices 401 and 402 respectively having the display for the keypad. Referring to FIGS. 11A and 11B, the display 100 (or, the displays 200 and 300) for the keypad may be used in the electronic devices 401 and 402 having a main display panel 403. More particularly, as shown in FIG. 11A, the electronic device 401 may be a fold-type mobile phone. The electronic device 401 includes the display panel 130 of the display for the multi-function keypad according to aspects of the present invention in addition to the main display panel 403. Thus the electronic device 401 includes two display panels. In addition, as shown in FIG. 11B, the electronic device 402 may be a slide-type mobile phone. The electronic device 402 also includes the display panel 130 of the display for the multi-function keypad according to aspects of the present invention in addition to the main display panel 403. Thus the electronic device 402 includes two display panels totally. In addition, the displays 100, 200, 300 for the keypad can be used in various electronic devices, such as an MP3 player, a car audio system, an auto console, a PDA, and other industrial displays, but is not limited thereto.

As described above, a user can input a desired instruction by using the keypad provided with the touch panel and pressing units corresponding to display regions that display different images according to the function selected by the user, thereby allowing the user interface environment to be improved. In addition, the user can input a desired instruction by using the keypad provided with separate pressing units in addition to inputting instructions through the touch panel, thereby allowing the user interface environment to be improved. Furthermore, the user can exactly input instructions by feeling a sense of pressing when the user presses the key.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display for a keypad, the display comprising:
a display panel having a first display region including pixels, second display regions including pixels, and a non-display region excluding pixels, the display panel including first separators that space the pixels in the first display region apart from each other and that space the pixels in each of the second display regions apart from each other, the second display regions being spaced apart from each other in the display panel by the non-display region, and the non-display region being defined by at least one second separator, the second separator having a greater width than that of the first separators;
a circuit board disposed on the display panel, the circuit board including a first opening corresponding to the first display region, second openings corresponding to the second display regions, respectively, and keys adjacent to the second openings;
a touch panel in the first display region in a shape corresponding to the first display region and being arranged to fill the first opening;
a pad on the circuit board, the pad including pressing units corresponding to the keys and including transparent windows corresponding to the second openings, the transparent windows being adjacent to the pressing units on the pad, and the pressing units and the keys being in an overlapping relationship with the at least one second separator and being in a non-overlapping relationship with the first separators; and
a cover on the display panel and fixed to the pad, the cover including third openings corresponding to both the transparent windows and the pressing units, the third openings exposing the pressing units and exposing the second display regions such that the pressing units are exposed adjacent to the second display regions via the third openings.

2. The display of claim 1, wherein:
the first display region and the second display regions are separated on the display panel by the non-display region in the display panel,
the pad is between the circuit board and the cover, and
the pressing units on the pad are adjacent to sides of the transparent windows.

3. The display of claim 1, wherein the display panel is an organic light emitting display panel or a liquid crystal display panel.

4. The display of claim 1, wherein the display panel comprises:
a data driver to apply data signals to the first and second display regions; and
a scan driver to apply scan signals to the first and second display regions.

5. The display of claim 1, wherein:
the second display regions are arranged symmetrically in the display panel with the at least one second separator of the non-display region therebetween, and
one of the third openings in the cover exposes one of the second display regions and exposes one of the pressing units such that the one of the second display regions are exposed adjacent to the one of the pressing units via the one of the third openings.

6. The display of claim 5, wherein the second display regions are arranged adjacent to a periphery of the first display region.

7. The display of claim 5, wherein the first display region is formed in any one type of circular, oval, and polygonal shapes.

8. The display of claim 2, wherein the second display regions are arranged in a matrix in the display panel that is exposed through the cover, and each of the pressing units exposed through the cover is adjacent to one of the second display regions arranged in the matrix.

9. The display of claim 1, wherein the touch panel is any one of resistive, electrostatic capacitive, ultrasonic, and infrared touch panels.

10. The display of claim 1, further comprising a packed layer formed on the first display region corresponding to the first display region to reduce a load applied to the display panel from the touch panel.

11. The display of claim 10, wherein the packed layer is formed of an organic material that adheres the touch panel to the display panel and transmits light.

12. The display of claim 1, wherein the touch panel comprises:
   front and rear substrates disposed to face each other;
   a first transparent conduction film provided on an inner surface of one of the front and rear substrates;
   a second transparent conduction film provided on an inner surface of the other substrate;
   a first electrode provided at first opposing ends of the first transparent conduction film; and
   a second electrode at second opposing ends of the second transparent conduction film,
   wherein the first opposing ends are adjacent to the second opposing ends.

13. The display of claim 1, wherein the keys comprise:
   a conduction pattern formed on a region corresponding to the non-display region; and
   an elastic member separated from the conduction pattern.

14. The display of claim 13, wherein the pressing units are projected upward away from the pad such that the conduction pattern and elastic member are separated from each other.

15. The display of claim 1, wherein the keys formed on the circuit board are dome switches.

16. The display of claim 1, wherein the pad includes:
   an insulation layer corresponding to the non-display region of the display panel, the non-display region surrounding the first display region and the second display regions on the display panel;
   a metal layer on the insulation layer, the metal layer including regions corresponding to the keys of the circuit board; and
   the pressing units on the metal layer in the regions corresponding to the keys.

17. The display of claim 1, further comprising a main circuit board under the display panel and electrically coupled to the display panel and circuit board.

18. The display of claim 1, further comprising a main circuit board electrically coupled to the display panel to send and receive electrical signals.

19. An electronic device comprising the display for the keypad of claim 1.

20. The electronic device of claim 19, further comprising a main display panel electrically and mechanically connected to the display for the keypad.

21. The display of claim 14, wherein the pressing units are protrusions on the pad facing a direction opposite the display panel and are in a non-overlapping relationship with the second openings in the circuit board.

22. The display of claim 1, wherein:
   each of the pixels of the first display region and each of the pixels of the second display region include light emitting layers therein, and
   a thickness of the at least one second separator is greater than thicknesses of the light emitting layers.

23. The display of claim 1, wherein the display panel includes more than one second separator and each second separator has the greater width than that of the first separators.

* * * * *